United States Patent
Li

(10) Patent No.: US 9,024,877 B2
(45) Date of Patent: May 5, 2015

(54) METHOD FOR AUTOMATICALLY SWITCHING USER INTERFACE OF HANDHELD TERMINAL DEVICE, AND HANDHELD TERMINAL DEVICE

(71) Applicant: Huawei Device Co., Ltd., Shenzhen (CN)

(72) Inventor: Liangcai Li, Wuhan (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/138,411

(22) Filed: Dec. 23, 2013

(65) Prior Publication Data

US 2014/0104172 A1 Apr. 17, 2014

Related U.S. Application Data

(63) Continuation of application No. PCT/CN2011/076211, filed on Jun. 23, 2011.

(51) Int. Cl.
*G06F 3/033* (2013.01)
*G06F 3/0346* (2013.01)
(Continued)

(52) U.S. Cl.
CPC ............ *G06F 3/0346* (2013.01); *G06F 1/1626* (2013.01); *G06F 9/4443* (2013.01); *G06F 2200/1637* (2013.01); *H04M 1/72569* (2013.01);
(Continued)

(58) Field of Classification Search
CPC .................................. G06F 3/033; G09G 5/08
USPC .................................................. 345/156–158
See application file for complete search history.

(56) References Cited

U.S. PATENT DOCUMENTS

2002/0167488 A1 11/2002 Hinckley et al.
2003/0085870 A1 5/2003 Hinckley
(Continued)

FOREIGN PATENT DOCUMENTS

CN 1553303 A 12/2004
CN 101133385 A 2/2008
(Continued)

OTHER PUBLICATIONS

Foreign Communication From a Counterpart Application, International Application No. PCT/CN2011/076211, International Search Report dated Mar. 15, 2012, 8 pages.
(Continued)

*Primary Examiner* — Pegeman Karimi
(74) *Attorney, Agent, or Firm* — Conley Rose, P.C.; Grant Rodolph; Nicholas K. Beaulieu

(57) ABSTRACT

A method for automatically switching a user interface of a handheld terminal device and a handheld terminal device are provided. The method in an embodiment of the present disclosure includes: obtaining a current state of the terminal device by using a first sensor, and obtaining current trigger states of touch sensors of the terminal device, where the current state is a horizontally holding state or a vertically holding state, and the touch sensors are set on the back and/or a side of the terminal device; determining a current holding mode of the terminal device according to the current state of the terminal device and the current trigger states of the touch sensors; and switching a user interface to a user interface corresponding to the current holding mode of the terminal device. An embodiment of the present disclosure further discloses the handheld terminal device.

8 Claims, 4 Drawing Sheets

(51) Int. Cl.
*G06F 1/16* (2006.01)
*H04M 1/725* (2006.01)
*G06F 9/44* (2006.01)
*H04M 1/02* (2006.01)

(52) U.S. Cl.
CPC ....... *H04M 2250/12* (2013.01); *H04M 2250/22* (2013.01); *H04M 1/0281* (2013.01)

(56) References Cited

U.S. PATENT DOCUMENTS

| | | | |
|---|---|---|---|
| 2005/0044510 A1* | 2/2005 | Yi | 715/864 |
| 2006/0197750 A1 | 9/2006 | Kerr et al. | |
| 2006/0197860 A1 | 9/2006 | Kim et al. | |
| 2007/0103454 A1 | 5/2007 | Elias | |
| 2008/0259094 A1* | 10/2008 | Kim et al. | 345/651 |
| 2010/0001980 A1 | 1/2010 | Kim et al. | |
| 2010/0285844 A1* | 11/2010 | Hosoi et al. | 455/566 |
| 2012/0001943 A1* | 1/2012 | Ishidera | 345/659 |
| 2012/0176413 A1* | 7/2012 | Kulik et al. | 345/659 |
| 2012/0262372 A1* | 10/2012 | Kim et al. | 345/158 |

FOREIGN PATENT DOCUMENTS

| | | |
|---|---|---|
| CN | 101626429 A | 1/2010 |
| CN | 101883175 A | 11/2010 |
| JP | 2008165451 A | 7/2008 |
| JP | 2008532185 A | 8/2008 |
| JP | 2011028603 A | 2/2011 |
| KR | 20060096869 A | 9/2006 |

OTHER PUBLICATIONS

Foreign Communication From a Counterpart Application, International Application No. PCT/CN2011/076211, Written Opinion dated Mar. 15, 2012, 5 pages.
Foreign Communication From a Counterpart Application, International Application No. PCT/CN2011/076211, English Translation of Written Opinion dated Mar. 15, 2012, 4 pages.
Partial English Translation and Abstract of Chinese Patent Application No. CN1553303, Jun. 3, 2014, 5 pages.
Foreign Communication From a Counterpart Application, European Application No. 11789265.3, Extended European Search Report, dated May 9, 2014, 8 pages.
Foreign Communication From a Counterpart Application, Korean Application No. 10-2013-7034831, Korean Office action dated Jan. 22, 2015, 4 pages.
Foreign Communication From a Counterpart Application, Korean Application No. 10-2013-7034831, English Translation of Korean Office action dated Jan. 22, 2015, 3 pages.
Partial English Translation and Abstract of Japanese Patent Application No. JP2008-165451A, Feb. 4, 2015, 36 pages.
Foreign Communication From A Counterpart Application, Japanese Application No. 2014-516154, Japanese Office Action dated Feb. 3, 2015, 2 pages.
Foreign Communication From A Counterpart Application, Japanese Application No. 2014-516154, English Translation of Japanese Office Action dated Feb. 3, 2015, 3 pages.

* cited by examiner

METHOD FOR AUTOMATICALLY SWITCHING USER INTERFACE OF HANDHELD TERMINAL DEVICE, AND HANDHELD TERMINAL DEVICE

CROSS-REFERENCE TO RELATED APPLICATION

This application is a continuation of International Patent Application No. PCT/CN2011/076211, filed on Jun. 23, 2011, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present disclosure relates to the field of handheld terminal applications, and in particular, to a method for automatically switching a user interface of a handheld terminal device, and a handheld terminal device.

BACKGROUND

With the development of science and technology, to increase the sense of science and technology of a mobile phone, provide convenience for the use of a user, and enhance the aesthetic feeling of the mobile phone, a designer upgrades a display screen of the mobile phone to a touch display screen, that is, implements a touch operation by superposing and combining a touch panel and a liquid crystal display module (LCM), so that the user is capable of directly using the mobile phone by touching the touch display screen.

In the prior art, holding modes of a mobile phone include a left-hand holding mode, a right-hand holding mode, and a two-hand holding mode, where the left-hand holding mode refers to that a user uses the left hand to hold the mobile phone and uses the left hand to operate the mobile phone, the right-hand holding mode refers to that a user uses the right hand to hold the mobile phone and uses the right hand to operate the mobile phone, and the two-hand holding mode refers to that the user uses both the left and right hands to hold the mobile phone and/or operate the mobile phone. A user interface (UI) of a touch mobile phone is generally designed for the right-hand holding mode, and in consideration of the use habit of a user, the UI of the mobile phone needs to be changed according to a holding mode of the user, so as to provide convenience for the user to use the mobile phone.

In most existing mobile phones, a user may select the left-hand holding mode, or the right-hand holding mode, or the two-hand holding mode by changing the setting of a mobile phone, so that the mobile phone switches a user interface according to a holding mode selected by the user. However, because the mobile phone cannot automatically differentiate whether the user adopts the left-hand holding mode, or the right-hand holding mode, or the two-hand holding mode to use the mobile phone, the mobile phone fails to automatically switch the user interface to a user interface corresponding to a current holding mode of the user, which is not flexible enough and lowers the user experience.

SUMMARY

Embodiments of the present disclosure provide a method for automatically switching a user interface of a handheld terminal device, and a handheld terminal device, which are capable of differentiating a holding mode currently adopted by a user, so that a mobile phone can automatically switch to a user interface corresponding to the holding mode, thereby improving intelligent interaction between the mobile phone and the user.

In an embodiment of the present disclosure, a method for automatically switching a user interface of a handheld terminal device includes: obtaining a current state of the terminal device by using a first sensor, and obtaining current trigger states of touch sensors of the terminal device, where the current state is a horizontally holding state or a vertically holding state, and the touch sensors are set on the back and/or a side of the terminal device; determining a current holding mode of the terminal device according to the current state of the terminal device and the current trigger states of the touch sensors; and switching a user interface to a user interface corresponding to the current holding mode of the terminal device.

In an embodiment of the present disclosure, a handheld terminal device includes: a sensing module configured to obtain a current state of the terminal device by using a first sensor, and obtain current trigger states of touch sensors of the terminal device by using the touch sensors, where the current state is a horizontally holding state or a vertically holding state, and the touch sensors are set on the back and/or a side of the terminal device; a determining module configured to determine a current holding mode of the terminal device according to the current state of the terminal device and the current trigger states of the touch sensors; and a switching module configured to switch a user interface to a user interface corresponding to the current holding mode of the terminal device.

It can be seen from the above technical solutions that, the embodiments of the present disclosure have the following advantages: A current holding mode of a mobile phone is determined according to a current state of the mobile phone and current trigger states of touch sensors configured on the mobile phone, so that the mobile phone is capable of automatically switching a user interface to a user interface corresponding to the current holding mode, which improves the intelligence of the mobile phone.

DETAILED DESCRIPTION

Embodiments of the present disclosure provide a method for automatically switching a user interface of a handheld terminal device, and a handheld terminal device, which are used for the handheld terminal device to determine a current holding mode of a user when the user uses the terminal device, and automatically switch a user interface of the terminal device to a user interface corresponding to the current holding mode of the user, thereby improving the intelligence of the terminal device.

It should be noted that, in the embodiments of the present disclosure, the handheld terminal device may be a mobile phone, an electronic book (E-book), a personal digital assistant (PDA), a palmtop computer, a human-machine interaction terminal, or any other handheld terminal device having a practical function. To help better understand the technical solutions of the present disclosure, in the embodiments of the present disclosure, an example in which the handheld terminal device is a mobile phone is taken to describe the technical solutions.

Figure 1:
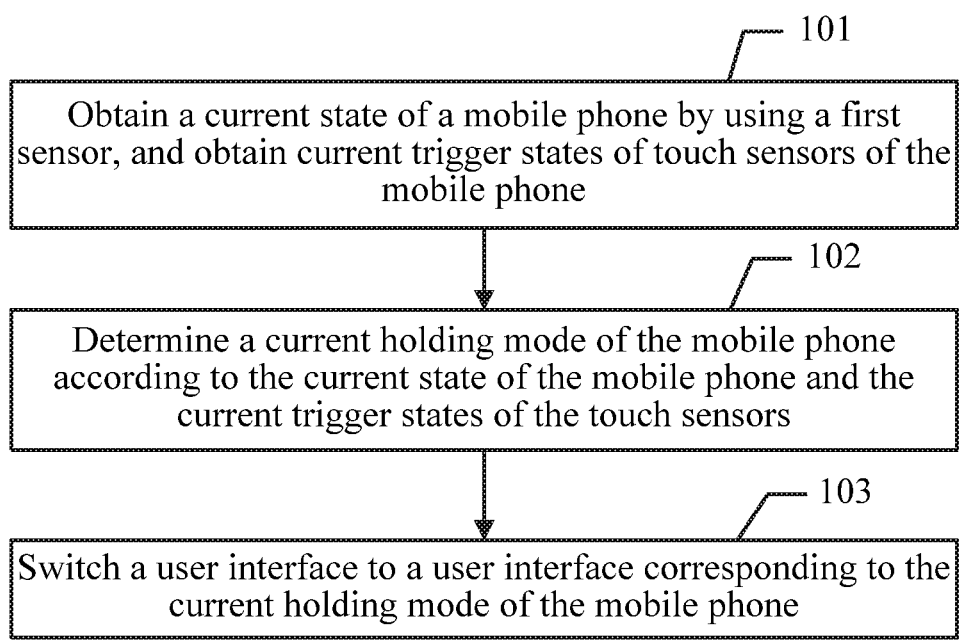
FIG. 1 is a schematic diagram of a method for automatically switching a user interface of a handheld terminal device according to an embodiment of the present disclosure.

Referring to FIG. 1, FIG. 1 shows a method for automatically switching a user interface of a handheld terminal device according to an embodiment of the present disclosure, which includes:

101: Obtain a current state of a mobile phone by using a first sensor, and obtain current trigger states of touch sensors of the mobile phone.

In the embodiment of the present disclosure, several touch sensors are set on the back and/or a side of the mobile phone, and after detecting being touched, the touch sensors transfer a trigger signal to a central processing unit in the mobile phone; therefore, the central processing unit in the mobile phone may obtain current trigger states of the touch sensors on the mobile phone. A common touch sensor may be a pressure sensor, which is not limited herein, and any sensor capable of detecting the touch between a hand and the sensor is applicable.

In the embodiment of the present disclosure, the first sensor capable of determining whether the mobile phone is in a horizontally holding state or vertically holding state is configured on the mobile phone, and the mobile phone obtains the current state of the mobile phone by using the first sensor, where the first sensor is a gyroscope or a gravity sensor, and the current state of the mobile phone includes the horizontally holding state or the vertically holding state. Reference may be made to the prior art for a specific manner for determining whether the current state of the mobile phone is the horizontally holding state or the vertically holding state, which is not described herein.

In the embodiment of the present disclosure, a gyroscope and a gravity sensor can be configured to determine the current state of the mobile phone. The gyroscope may measure an angular velocity when the mobile phone is rotated, and after performing processing such as angular velocity integration on the obtained angular velocity, the central processing unit in the mobile phone may obtain an angle that the mobile phone is rotated in a certain period, that is, the angle is a rotating angle of the mobile phone relative to the horizontally holding state or relative to the vertically holding state, and the central processing unit in the mobile phone is capable of accurately determining whether the mobile phone is in the horizontally holding state or the vertically holding state after calculating and analyzing the rotating angle. The gravity sensor is capable of detecting a change of a gravity acceleration of the mobile phone, and the central processing unit in the mobile phone is also capable of determining whether the mobile phone is in the horizontally holding state or the vertically holding state by performing processing on the gravity acceleration. The gyroscope and the gravity sensor are widely applied in mobile phones, which are not described herein.

102: Determine a current holding mode of the mobile phone according to the current state of the mobile phone and the current trigger states of the touch sensors.

The mobile phone determines the holding mode of the mobile phone according to the current state of the mobile phone and the current trigger states of the touch sensors, where in the present disclosure, the current trigger states of the touch sensors refer to distribution of currently triggered touch sensors, and the holding mode of the mobile phone includes any one of a right-hand holding mode, a left-hand holding mode, and a two-hand holding mode.

103: Switch a user interface to a user interface corresponding to the current holding mode of the mobile phone.

In the embodiment of the present disclosure, after determining the current holding mode of the mobile phone according to the current state of the mobile phone and the current trigger states of the touch sensors, the mobile phone switches the user interface to the user interface corresponding to the current holding mode of the mobile phone.

In the embodiment of the present disclosure, the mobile phone is capable of determining the current holding mode of the mobile phone according to the current state of the mobile phone and the current trigger states of the touch sensors, and switching the user interface to the user interface corresponding to the holding mode, so that the mobile phone is capable of automatically adjusting the user interface according to a current holding mode of a user, which provides convenience for the user to use the mobile phone and improves the intelligence of the mobile phone.

Figure 2:
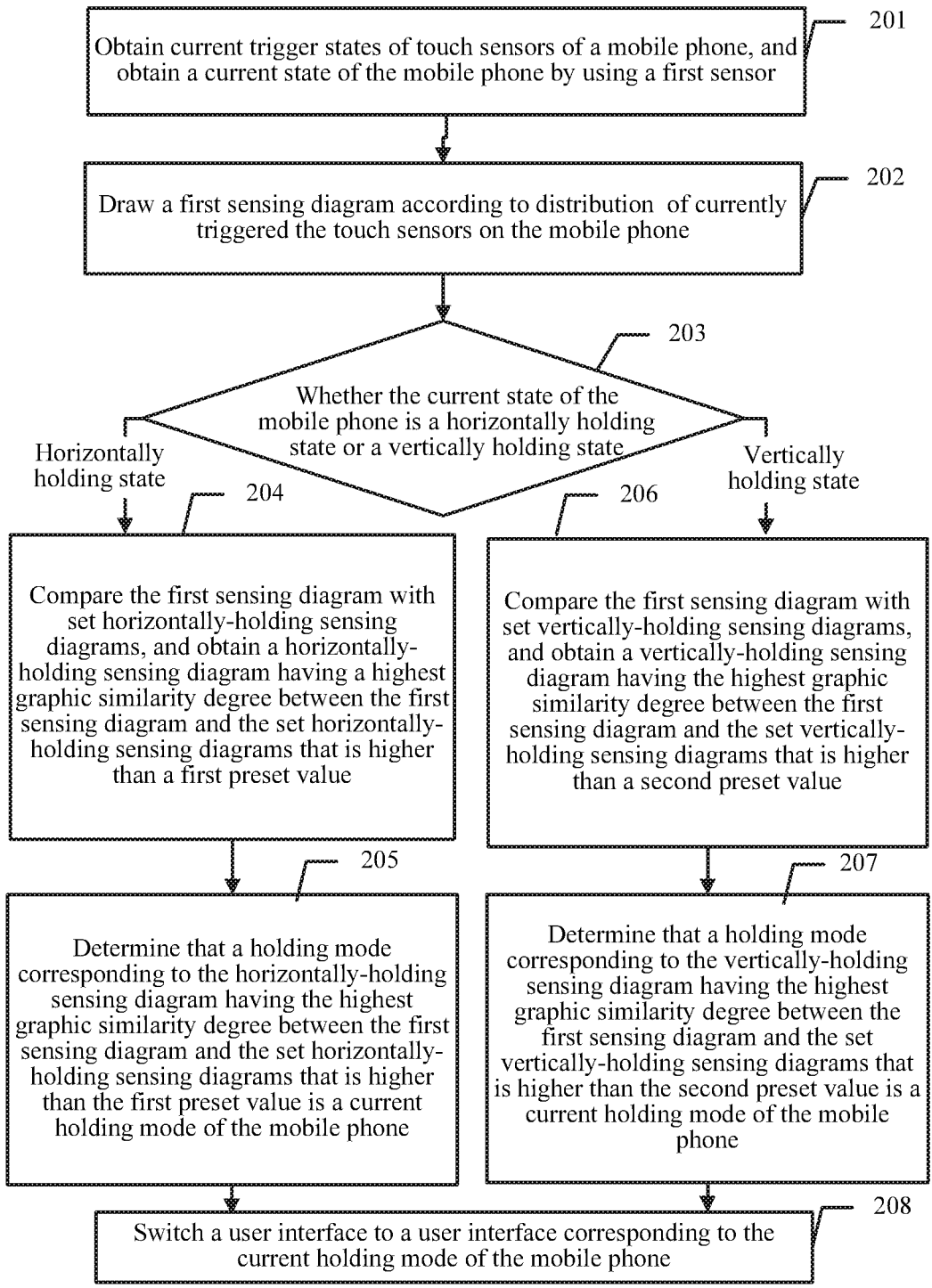
FIG. 2 is another schematic diagram of a method for automatically switching a user interface of a handheld terminal device according to an embodiment of the present disclosure.

For better understanding the embodiment of the present disclosure, refer to FIG. 2. FIG. 2 shows an embodiment of a method for automatically switching a user interface of a handheld terminal device according to an embodiment of the present disclosure. The method includes:

201: Obtain current trigger states of touch sensors of a mobile phone, and obtain a current state of the mobile phone by using a first sensor.

In the embodiment of the present disclosure, the touch sensors are set on the back and/or a side of the mobile phone, and the current trigger states of the touch sensors of the mobile phone may be obtained, and at the same time, the mobile phone obtains the current state of the mobile phone by using the first sensor, where the first sensor is a gyroscope or a gravity sensor equipped on the mobile phone.

Figure 3:
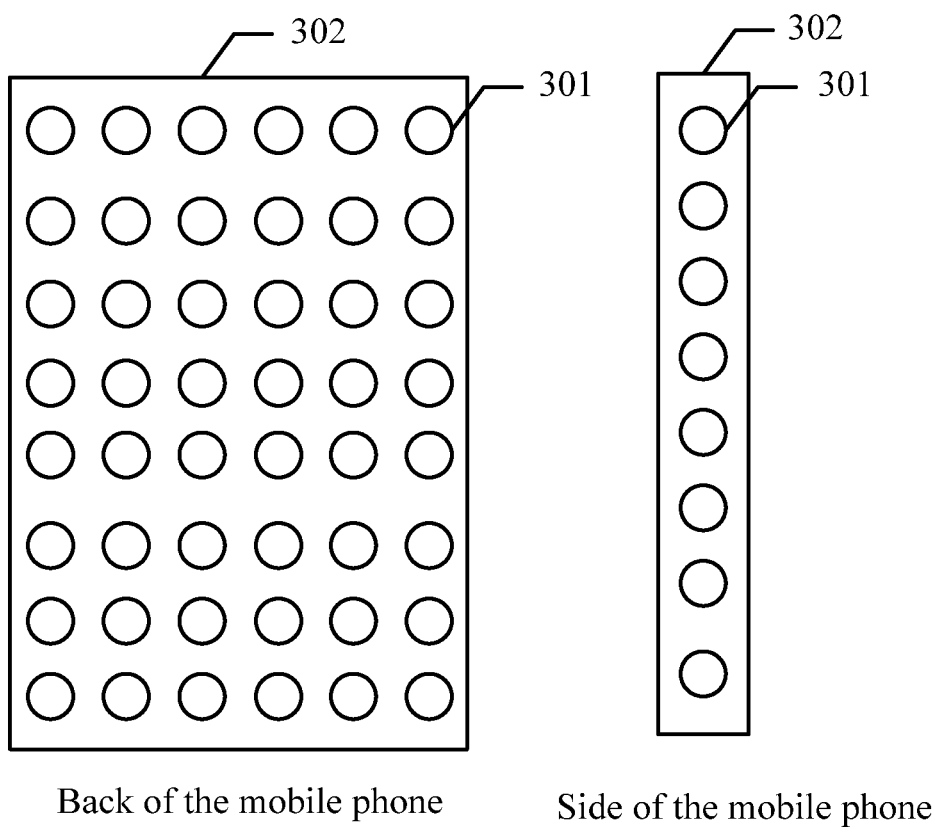
FIG. 3 is a schematic diagram of touch sensors set on the back and a side of a handheld terminal device according to an embodiment of the present disclosure.

It should be noted that, in the embodiment of the present disclosure, multiple manners for setting the touch sensors on the mobile phone exist, for example, the touch sensors may be set on the back of the mobile phone in a matrix arrangement manner, or several touch sensors are set on four sides of the mobile phone, or the touch sensors are set on the back and four sides of the mobile phone, and in an actual application, a setting area of the touch sensors and a type and flexibility of the touch sensors may be determined as required, which are not limited herein. For better understanding, refer to FIG. 3. FIG. 3 is a schematic diagram of touch sensors set on the back of a mobile phone in a matrix arrangement manner and touch sensors set on a side of the mobile phone, where 301 is a touch sensor, and 302 is a case of the mobile phone.

In the embodiment of the present disclosure, the touch sensors set on the back and/or a side of the mobile phone may be pressure sensors, and the pressure sensors are capable of detecting the pressure generated by a hand of a user on the back and/or the side of the mobile phone when the user holds the mobile phone, converting the pressure into a signal that can be output, and transferring the signal to a control unit in the mobile phone; therefore, the mobile phone may obtain the current trigger states of the touch sensors.

202: Draw a first sensing diagram according to distribution of currently triggered touch sensors on the mobile phone.

In the embodiment of the present disclosure, the mobile phone draws the first sensing diagram according to the distribution of the currently triggered touch sensors on the mobile phone, where the first sensing diagram is a position distribution diagram of the currently triggered touch sensors.

203: Determine whether the current state of the mobile phone is a horizontally holding state or a vertically holding state, perform step 204 if the mobile phone is in the horizontally holding state, and perform step 206 if the mobile phone is in the vertically holding state.

In the embodiment of the present disclosure, in step 201, the current state of the mobile phone is obtained by using the first sensor, and in step 203, that the mobile phone determines whether the current state of the mobile phone is the horizontally holding state or the vertically holding state specifically includes: determining that the mobile phone is in the horizontally holding state if it is determined that a direction of the mobile phone is a direction of the horizontally holding state in step 201, and determining that the mobile phone is in the vertically holding state if it is determined that the direction of the mobile phone is a direction of the vertically holding state in step 201.

204: Compare the first sensing diagram with set horizontally-holding sensing diagrams, and obtain a horizontally-holding sensing diagram having a highest graphic similarity degree between the first sensing diagram and the set horizontally-holding sensing diagrams that is higher than a first preset value.

When the mobile phone is in the horizontally holding state, the first sensing diagram may be compared with the set horizontally-holding sensing diagrams, and the horizontally-holding sensing diagram having the highest graphic similarity degree between the first sensing diagram and the set horizontally-holding sensing diagrams that is higher than the first preset value is obtained. In the embodiment of the present disclosure, the set horizontally-holding sensing diagrams in the mobile phone include position distribution diagrams of touch sensors which correspond to different holding modes when the mobile phone is in the horizontally holding state. It should be noted that, in the embodiment of the present disclosure, the set horizontally-holding sensing diagrams are multiple common graphics that may exist and are obtained according to position distribution of currently triggered touch sensors, where the common graphics are obtained by the mobile phone when the mobile phone is in the horizontally holding state and a user adopts a right-hand holding mode, or a left-hand holding mode, or a two-hand holding mode to use the mobile phone.

205: Determine that a holding mode corresponding to the horizontally-holding sensing diagram having a highest graphic similarity degree between the first sensing diagram and the set horizontally-holding sensing diagrams that is higher than the first preset value is a current holding mode of the mobile phone, and continue to perform step 208.

After obtaining the horizontally-holding sensing diagram having the highest graphic similarity between the first sensing diagram and the set horizontally-holding sensing diagrams that is higher than the first preset value, the mobile phone determines that the holding mode corresponding to the horizontally-holding sensing diagram having the highest graphic similarity degree between the first sensing diagram and the set horizontally-holding sensing diagrams that is higher than the first preset value is the current holding mode of the mobile phone, where the first preset value may be set as required, for example, the first preset value of the similarity degree may be set to 50% or 70%, and may be set as required in an actual application, which is not limited herein.

206: Compare the first sensing diagram with set vertically-holding sensing diagrams, and obtain a vertically-holding sensing diagram having a highest graphic similarity degree between the first sensing diagram and the set vertically-holding sensing diagrams that is higher than a second preset value.

When the mobile phone is in the vertically holding state, the mobile phone compares the first sensing diagram with the set vertically-holding sensing diagrams, and obtains the vertically-holding sensing diagram having the highest graphic similarity degree between the first sensing diagram and the set vertically-holding sensing diagrams that is higher than the second preset value. In the embodiment of the present disclosure, the set vertically-holding sensing diagrams in the mobile phone include sensing diagrams corresponding to different holding modes when the mobile phone is in the vertically holding state. It should be noted that, in the embodiment of the present disclosure, the set vertically-holding sensing diagrams are multiple common graphics obtained according to distribution of currently triggered touch sensors, where the common graphics are obtained by the mobile phone when the mobile phone is in the vertically holding state and the user adopts the right-hand holding mode, or the left-hand holding mode, or the two-hand holding mode to use the mobile phone.

207: Determine that a holding mode corresponding to the vertically-holding sensing diagram having the highest graphic similarity degree between the first sensing diagram and the set vertically-holding sensing diagrams that is higher than the second preset value is the current holding mode of the mobile phone.

After obtaining the vertically-holding sensing diagram having the highest graphic similarity degree between the first sensing diagram and the set vertically-holding sensing diagrams that is higher than the second preset value, the mobile phone determines that the holding mode corresponding to the vertically-holding sensing diagram is the current holding mode of the mobile phone, where the second preset value may be set as required, for example, the second preset value of the similarity degree may be set to 50% or 70%, and may be set as required in an actual application, which is not limited herein.

208: Switch a user interface to a user interface corresponding to the current holding mode of the mobile phone.

After determining the current holding mode of the user, the mobile phone switches the user interface to the user interface corresponding to the current holding mode of the mobile phone.

It should be noted that, in the embodiment of the present disclosure, when the mobile phone is in the horizontally holding state, if the similarity degree between a set horizontally-holding sensing diagram and the first sensing diagram is smaller than the first preset value, or when the mobile phone is in the vertically holding state, if the similarity degree between a set vertically-holding sensing diagram and the first sensing diagram is smaller than the second preset value, it is determined that the current holding mode of the mobile phone is a set default holding mode of the mobile phone, where the default holding mode may be the left-hand holding mode, or the right-hand holding mode, or the two-hand holding mode.

In the embodiment of the present disclosure, the current holding mode of the mobile phone is determined by using the current trigger states of the touch sensors of the mobile phone and according to the current state of the mobile phone, so that the mobile phone is capable of automatically switching the current user interface to the user interface corresponding to the current holding mode, which enhances the flexibility and intelligence of the mobile phone and improves the user experience.

Figure 4:
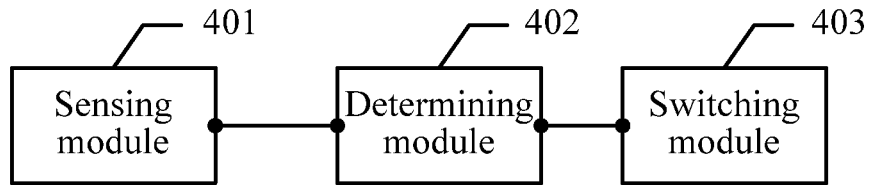
FIG. 4 is a schematic diagram of a handheld terminal device according to an embodiment of the present disclosure.

Referring to FIG. 4, FIG. 4 shows an embodiment of a handheld terminal device according to an embodiment of the present disclosure, where touch sensors are configured on the terminal device and the terminal device includes: a sensing module 401 configured to obtain a current state of the terminal device by using a first sensor, and obtain current trigger states of the touch sensors of the terminal device, where the touch sensors are set on the back and/or a side of the terminal device; a determining module 402 configured to determine a current holding mode of the terminal device according to the current state of the terminal device and the current trigger states of the touch sensors; and a switching module 403 configured to switch a user interface to a user interface corresponding to the current holding mode of the terminal device.

The first sensor is a gyroscope or a gravity sensor; the holding mode is any one of a left-hand holding mode, a right-hand holding mode, and a two-hand holding mode; and a direction of the terminal device is a horizontally holding state or a vertically holding state.

In the embodiment of the present disclosure, the sensing module 401 of the terminal device obtains the current trigger states of the touch sensors of the terminal device, and obtains the current state of the terminal device by using the first sensor; the determining module 402 determines the current holding mode of the terminal device according to the current state of the terminal device and the current trigger states of the touch sensors; and the switching module 403 switches the user interface to the user interface corresponding to the current holding mode of the terminal device.

In the embodiment of the present disclosure, the terminal device determines the current holding mode of the terminal device according to the current state of the mobile phone and the current trigger states of the touch sensors, so that the terminal device is capable of automatically switching the user interface to the user interface corresponding to the current holding mode of the terminal device, which improves the intelligence of the terminal device.

Figure 5:
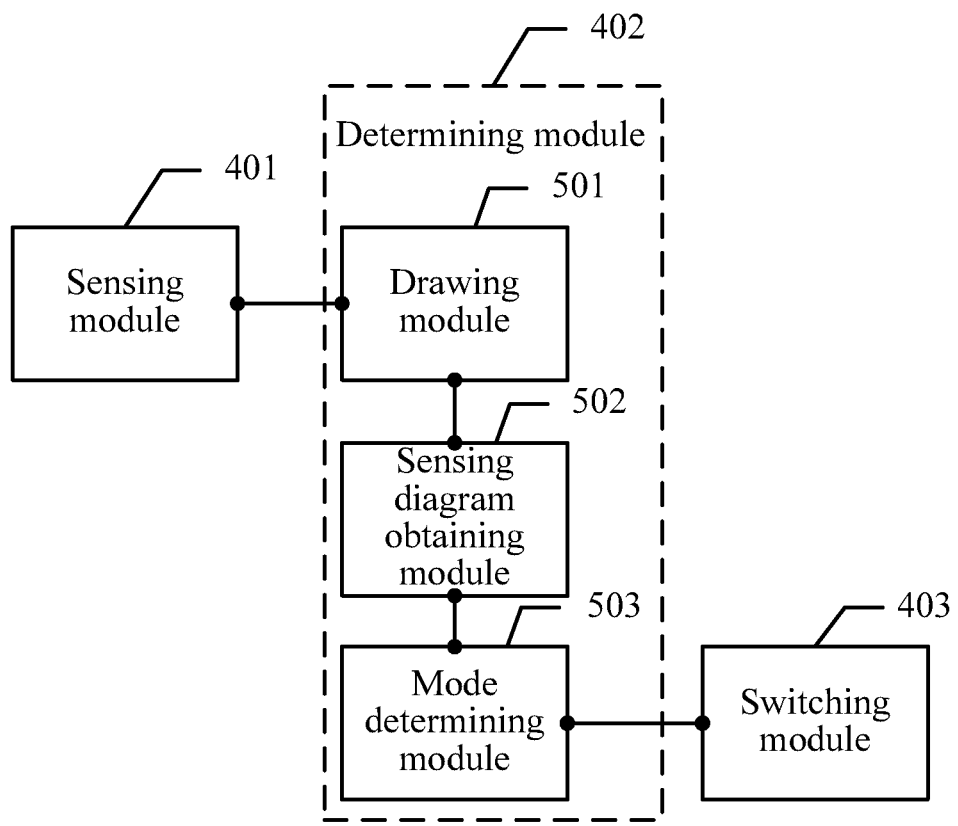
FIG. 5 is another schematic diagram of a handheld terminal device according to an embodiment of the present disclosure.

To better understand the technology, referring to FIG. 5, FIG. 5 shows an embodiment of a handheld terminal device according to an embodiment of the present disclosure, which includes the sensing module 401, the determining module 402, and the switching module 403 in the embodiment as shown in FIG. 4 and is similar to the described content in the embodiment as shown in FIG. 4, so the details are not described herein.

The determining module 402 includes: a drawing module 501 configured to draw a first sensing diagram according to distribution of currently triggered touch sensors on the terminal device, where the first sensing diagram is a position distribution diagram of the currently triggered touch sensors; a sensing diagram obtaining module 502 configured to: when the terminal device is in the horizontally holding state, compare the first sensing diagram with set horizontally-holding sensing diagrams, and obtain a horizontally-holding sensing diagram having a highest graphic similarity degree between the first sensing diagram and the set horizontally-holding sensing diagrams that is higher than a first preset value, and the set horizontally-holding sensing diagrams include position distribution diagrams of touch sensors which correspond to different holding modes when the terminal device is in the horizontally holding state; and a mode determining module 503 configured to determine that a holding mode corresponding to the horizontally-holding sensing diagram having the highest graphic similarity degree between the first sensing diagram and the set horizontally-holding sensing diagrams that is higher than the first preset value is a current holding mode of the terminal device.

In addition, the sensing diagram obtaining module 502 is further configured to: when the terminal device is in the vertically holding state, compare the first sensing diagram with set vertically-holding sensing diagrams, and obtain a vertically-holding sensing diagram having a highest graphic similarity degree between the first sensing diagram and the set vertically-holding sensing diagrams that is higher than a second preset value, and the set vertically-holding sensing diagrams include position distribution diagrams of touch sensors which correspond to different holding modes when the terminal device is in the vertically holding state.

The mode determining module 503 is further configured to: when in the vertically holding state, determine that a holding mode corresponding to the vertically-holding sensing diagram having the highest graphic similarity degree between the first sensing diagram and the set vertically-holding sensing diagrams that is higher than the second preset value is the current holding mode of the terminal device, and is configured to: when the terminal device is in the horizontally holding state, if the similarity degree between a set horizontally-holding sensing diagram and the first sensing diagram is smaller than the first preset value, or when the terminal device is in the vertically holding state, if the similarity degree between a set vertically-holding sensing diagram and the first sensing diagram is smaller than the second preset value, determine that the current holding mode of the terminal device is a set default holding mode of the terminal device.

In the embodiment of the present disclosure, the touch sensors are set on the back and/or a side of the terminal device, so that the terminal device is capable of determining the current holding mode of the terminal device according to the current state of the mobile phone and the current trigger states of the touch sensors, and switching a user interface to a user interface corresponding to the current holding mode, which enhances the intelligence of the terminal device and improves the user experience.

It should be noted that, the terminal device in FIG. 4 or FIG. 5 may be a mobile phone, an E-book, a PDA, a palmtop computer, a human-machine interaction terminal, or any other handheld terminal device having a display function. In the embodiment of the present disclosure, when the terminal device is a mobile phone, the mobile phone may further include parts such as a case, a circuit board, a display screen, a processor, a radio frequency circuit, a microphone, a loudspeaker, and a power supply circuit. The display screen is placed on the case, the circuit board is placed in a space enclosed by the case, the processor and the radio frequency circuit are set on the circuit board; the processor includes function modules in the mobile phone shown in FIG. 4 or FIG. 5, of which the specific working principles are not described in detail; the radio frequency circuit is configured to establish communication between the mobile phone and a wireless network, and implement data receiving and sending between the mobile phone and a server in the wireless network; the microphone is configured to collect sound and convert the collected sound into sound data, so that the mobile phone sends the sound data to the wireless network through the radio frequency circuit; the loudspeaker is configured to restore the sound data received by the mobile phone through the radio frequency circuit from the wireless network into the sound and play the sound for the user; and the power supply circuit is configured to power circuits or parts of the mobile phone.

Persons of ordinary skill in the art may understand that all or a part of the steps of the method in the embodiments may be implemented by a program instructing relevant hardware. The program may be stored in a computer readable storage medium. The storage medium may be a read-only memory, a magnetic disk, or an optical disk.

The method for automatically switching a user interface of a handheld terminal device and the handheld terminal device provided by the present disclosure are described in detail in the above, and for persons of ordinary skill in the art, modifications may be made to specific implementation manners and the application scope according to the idea of the embodiments of the present disclosure, and to sum up, the content of the disclosure should not be understood as a limitation to the present disclosure.

What is claimed is:

1. A method for automatically switching a user interface of a handheld terminal device, comprising:

obtaining a current state of the terminal device by using a first sensor, wherein the current state is a horizontally holding state or a vertically holding state;

obtaining current trigger states of touch sensors of the terminal device, wherein the touch sensors are set on the back and/or a side of the terminal device;

determining a current holding mode of the terminal device according to the current state of the terminal device and the current trigger states of the touch sensors; and switching a user interface to a user interface corresponding to the current holding mode of the terminal device, wherein determining the current holding mode of the terminal device according to the current state of the terminal device and the current trigger states of the touch sensors comprises:

drawing a first sensing diagram according to a distribution of currently triggered touch sensors on the terminal device, wherein the first sensing diagram is a position distribution diagram of the currently triggered touch sensors;

when the terminal device is in the horizontally holding state, comparing the first sensing diagram with set horizontally-holding sensing diagrams, and obtaining a horizontally-holding sensing diagram having a highest graphic similarity degree between the first sensing diagram and the set horizontally-holding sensing diagrams that is higher than a first preset value and wherein the set horizontally-holding sensing diagrams comprise position distribution diagrams of touch sensors which correspond to different holding modes when the terminal device is in the horizontally holding state; and determining that a holding mode corresponding to the horizontally-holding sensing diagram having the highest graphic similarity degree between the first sensing diagram and the set horizontally-holding sensing diagrams that is higher than the first preset value is the current holding mode of the terminal device; or when the terminal device is in the vertically holding state, comparing the first sensing diagram with set vertically-holding sensing diagrams, and obtaining a vertically-holding sensing diagram having a highest graphic similarity degree between the first sensing diagram and the set vertically-holding sensing diagrams that is higher than a second preset value, and wherein the set vertically-holding sensing diagrams comprise position distribution diagrams of touch sensors which correspond to different holding modes when the terminal device is in the vertically holding state; and determining that a holding mode corresponding to the vertically-holding sensing diagram having the highest graphic similarity degree between the first sensing diagram and the set vertically-holding sensing diagrams that is higher than the second preset value is the current holding mode of the terminal device.

2. The method according to claim 1, further comprising determining that the current holding mode of the terminal device is a set default holding mode of the terminal device when the terminal device is in the horizontally holding state and a similarity degree between a set horizontally-holding sensing diagram and the first sensing diagram is smaller than the first preset value.

3. The method according to claim 1, further comprising determining that the current holding mode of the terminal device is a set default holding mode of the terminal device when the terminal device is in the vertically holding state and the similarity degree between a set vertically-holding sensing diagram and the first sensing diagram is smaller than the second preset value.

4. A handheld terminal device, wherein touch sensors are set on the back and/or a side of the terminal device, and the terminal device comprises:

a sensing module configured to obtain a current state of the terminal device by using a first sensor, and obtain current trigger states of the touch sensors of the terminal device by using the touch sensors, wherein the current state is a horizontally holding state or a vertically holding state;

a determining module configured to determine a current holding mode of the terminal device according to the current state of the terminal device and the current trigger states of the touch sensors; and a switching module configured to switch a user interface to a user interface corresponding to the current holding mode of the terminal device, wherein the determining module comprises:

a drawing module configured to draw a first sensing diagram according to a distribution of currently triggered touch sensors on the terminal device, wherein the first sensing diagram is a position distribution diagram of the currently triggered touch sensors;

a sensing diagram obtaining module configured to:

when the terminal device is in the horizontally holding state, compare the first sensing diagram with set horizontally-holding sensing diagrams, and obtain a horizontally-holding sensing diagram having a highest graphic similarity degree between the first sensing diagram and the set horizontally-holding sensing diagrams that is higher than a first preset value, and wherein the set horizontally-holding sensing diagrams comprise position distribution diagrams of touch sensors which correspond to different holding modes when the terminal device is in the horizontally holding state; and when the terminal device is in the vertically holding state, compare the first sensing diagram with set vertically-holding sensing diagrams, and obtain a vertically-holding sensing diagram having a highest graphic similarity degree between the first sensing diagram and the set vertically-holding sensing diagrams that is higher than a second preset value, and wherein the set vertically-holding sensing diagrams comprise position distribution diagrams of touch sensors which correspond to different holding modes when the terminal device is in the vertically holding state; and a mode determining module configured to:
  when in the horizontally holding state, determine that a holding mode corresponding to the horizontally-holding sensing diagram having the highest graphic similarity degree between the first sensing diagram and the set horizontally-holding sensing diagrams that is higher than the first preset value is the current holding mode of the terminal device; and
  when in the vertically holding state, determine that a holding mode corresponding to the vertically-holding sensing diagram having the highest graphic similarity degree between the first sensing diagram and the set vertically-holding sensing diagrams that is higher than the preset value is the current holding mode of the terminal device.

5. The terminal device according to claim 4, wherein the mode determining module is further configured to:
  determine that the current holding mode of the terminal device is a set default holding mode of the terminal device when the terminal device is in the horizontally holding state and a similarity degree between a set horizontally-holding sensing diagram and the first sensing diagram is smaller than the first preset value; and
  determine that the current holding mode of the terminal device is a set default holding mode of the terminal device when the terminal device is in the vertically holding state and the similarity degree between a set vertically-holding sensing diagram and the first sensing diagram is smaller than the second preset value.

6. A non-transitory computer-readable medium having computer usable instructions stored thereon for execution by a processor, wherein the instructions cause the processor to:
  obtain a current state of a terminal device by using a first sensor, wherein the current state is a horizontally holding state or a vertically holding state;
  obtain current trigger states of touch sensors of the terminal device, wherein the touch sensors are set on the back and/or a side of the terminal device;
  determine a current holding mode of the terminal device according to the current state of the terminal device and the current trigger states of the touch sensors; and
  switch a user interface to a user interface corresponding to the current holding mode of the terminal device,
  wherein the current holding mode of the terminal device is determined according to the current state of the terminal device and the current trigger states of the touch sensors comprises the instructions causing the processor to:
  draw a first sensing diagram according to a distribution of currently triggered touch sensors on the terminal device, wherein the first sensing diagram is a position distribution diagram of the currently triggered touch sensors;
  when the terminal device is in the horizontally holding state, compare the first sensing diagram with set horizontally-holding sensing diagrams, and obtain a horizontally-holding sensing diagram having a highest graphic similarity degree between the first sensing diagram and the set horizontally-holding sensing diagrams that is higher than a first preset value, and wherein the set horizontally-holding sensing diagrams comprise position distribution diagrams of touch sensors which correspond to different holding modes when the terminal device is in the horizontally holding state; and determine that a holding mode corresponding to the horizontally-holding sensing diagram having the highest graphic similarity degree between the first sensing diagram and the set horizontally-holding sensing diagrams that is higher than the first preset value is the current holding mode of the terminal device; or
  when the terminal device is in the vertically holding state, compare the first sensing diagram with set vertically-holding sensing diagrams, and obtain a vertically-holding sensing diagram having a highest graphic similarity degree between the first sensing diagram and the set vertically-holding sensing diagrams that is higher than a second preset value, and wherein the set vertically-holding sensing diagrams comprise position distribution diagrams of touch sensors which correspond to different holding modes when the terminal device is in the vertically holding state; and determine that a holding mode corresponding to the vertically-holding sensing diagram having the highest graphic similarity degree between the first sensing diagram and the set vertically-holding sensing diagrams that is higher than the second preset value is the current holding mode of the terminal device.

7. The non-transitory computer-readable medium according to claim 6, wherein the instructions further cause the processor to determine that the current holding mode of the terminal device is a set default holding mode of the terminal device when the terminal device is in the horizontally holding state and a similarity degree between a set horizontally-holding sensing diagram and the first sensing diagram is smaller than the first preset value.

8. The non-transitory computer-readable medium according to claim 6, wherein the instructions further cause the processor to determine that the current holding mode of the terminal device is a set default holding mode of the terminal device when the terminal device is in the vertically holding state and the similarity degree between a set vertically-holding sensing diagram and the first sensing diagram is smaller than the second preset value.

* * * * *